May 22, 1962 — R. G. DAY — 3,036,153
ELECTRO-OPTICAL SCANNING SYSTEM
Filed Sept. 2, 1960 — 2 Sheets-Sheet 1
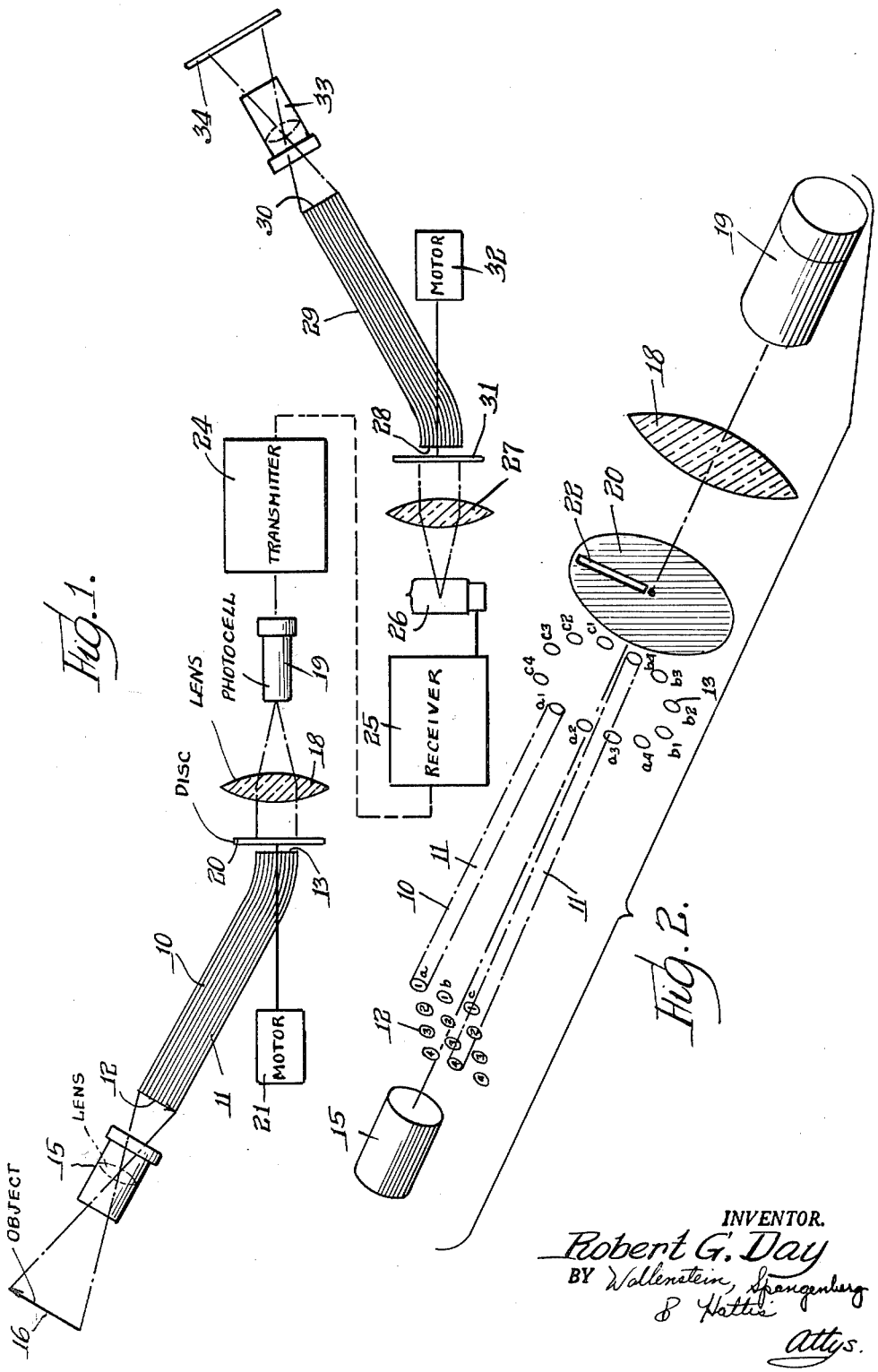
INVENTOR.
Robert G. Day May 22, 1962  R. G. DAY  3,036,153
ELECTRO-OPTICAL SCANNING SYSTEM
Filed Sept. 2, 1960  2 Sheets-Sheet 2
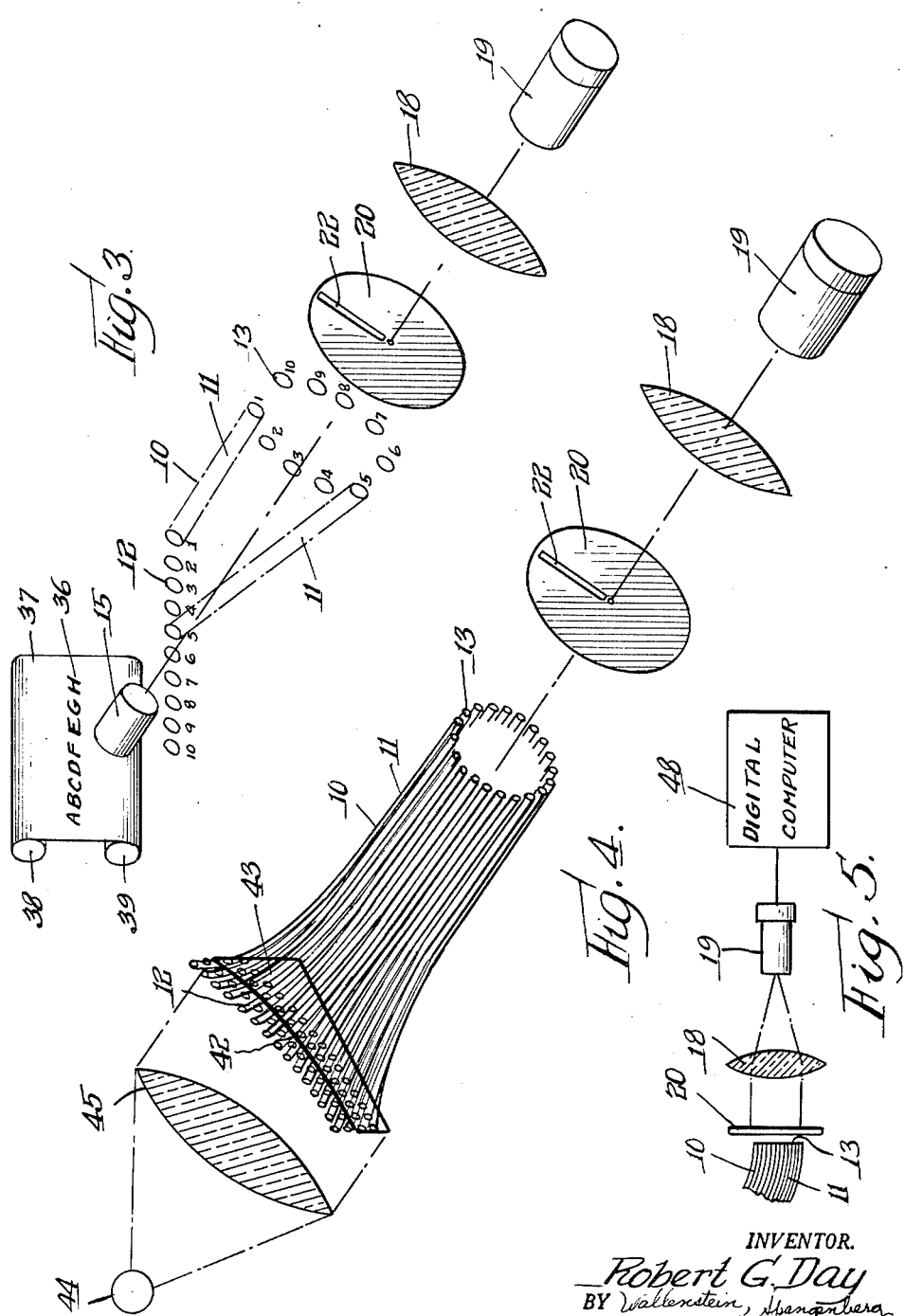
INVENTOR.
Robert G. Day
BY Wallenstein, Spangenberg
& Hattis
attys.

United States Patent Office 3,036,153
Patented May 22, 1962

3,036,153
ELECTRO-OPTICAL SCANNING SYSTEM
Robert G. Day, Middlesex, N.J., assignor to Gulton Industries, Inc., Metuchen, N.J., a corporation of New Jersey
Filed Sept. 2, 1960, Ser. No. 53,770
12 Claims. (Cl. 178—7.1)

The principal object of this invention is to provide an improved electro-optical scanning system, which is simple and inexpensive in construction, which is foolproof and high speed in operation, which is uniform in sensitivity and focus, which allows the use of normal objective lenses and image sizes, which allows scanning at a point removed from the image, which provides for accurate reproduction, and which provides for operation of digital computers or the like.

Briefly, the electro-optical scanning system of this invention comprises a fiber optical bundle including a plurality of optically isolated light transmitting fibers terminating at one end in an image plane and at the other end in a scanning plane. Means are provided for applying a light image to the fiber ends in the image plane for transmission by the fibers to the scanning plane. The fiber ends in the scanning plane are arranged in a circle, and scanning means including a stationary photoelectric pickup unit facing the scanning plane and a rotating scanner having a light transmitting aperture therein are located adjacent the scanning plane for progressively scanning the circularly arranged fiber ends in the scanning plane for pulsing the photoelectric pickup unit and creating electrical pulses in accordance with the light intensities at said fiber ends.

Preferably, the scanning means include a stationary photoelectric pickup unit adjacent and facing the scanning plane, means for condensing light from the circularly arranged fiber ends in the scanning plane onto the photoelectric pickup unit, and a rotating radial slit scanner located between the scanning plane and the light condensing means progressively sweeping the circularly arranged fiber ends in the scanning plane for pulsing the photoelectric pickup unit in accordance with the light intensities at said fiber ends.

The width of the radial slit of the rotating scanner is equal to or less than the width of the fiber ends so that each circularly arranged fiber end in the scanning plane is individually scanned and a corresponding electrical pulse produced in accordance with the light intensity at that fiber end. If the spacing between the circularly arranged fiber ends is less than the width of the radial slit, the radial slit in sweeping over the fiber ends will expose adjacent portions of adjacent fiber ends so that the electrical pulses produced will be somewhat modulated in character, this being wholly satisfactory and desirable for certain applications such as telemetering and reproduction of images. However, if the spacing between the circularly arranged fiber ends is greater than the width of the radial slit, there will be a definite and positive cut-off of light as the radial slit sweeps from one fiber end to the other, and, as a result, separate and discrete electrical pulses will be created in accordance with the light intensities of the fiber ends. Such an arrangement would also be wholly satisfactory for telemetering and image reproduction purposes and would, further, be useful in operating digital computers and the like.

For telemetering and image reproduction purposes, a second fiber optical bundle corresponding to the first fiber optical bundle is utilized, it including a plurality of optically isolated light transmitting fibers terminating at one end in a read in plane and at the other end in a read out plane with the fiber ends in the read in plane being arranged in a circle. Control means, arranged adjacent the read in plane of the second optical bundle, include a light source which is pulsed in accordance with the electrical pulses created by the scanning means and a rotating disc including a radial slit for pregressively applying the light pulses to the circularly arranged fiber ends in the read in plane of the second fiber optical bundle for transmission by the fibers to the read out plane for reproducing the light image at the read out plane. Of course, the speed and position of the rotating disc must be synchronized with that of the rotating scanner to obtain appropriate read out and reproduction of the image. The electrical impulses may control the pulsing of the light source in various ways, as by wire connection, cable, radio, magnetic tapes, memory systems, and the like.

The fiber ends in the image plane of the fiber optical bundle may be arranged in an area pattern for reproduction of a planar light image applied thereto and the fiber ends may be randomly arranged or regularly arranged in rows. Also, the ends of the fibers in the image plane may be arranged in a single row, and means may be provided for moving an object to be scanned past the single row of fiber ends, for line scanning of the moving object, such an arrangement being admirably suited for facsimile systems. Further, the ends of the fibers in the image plane may be arranged in a plurality of rows in accordance with a predetermined contour for checking the accuracy of the contour of an object, as for quality control purposes. Other arrangements of the fiber ends in the image plane may also be utilized, within the purview of this invention, for other purposes.

Further objects of this invention reside in the details of construction of the electro-optical scanning system and in the cooperative relationships between the component parts thereof.

Other objects and advantages will become apparent to those skilled in the art upon reference to the accompanying specification, claims and drawings in which:

FIGURE 1 is an illustration of the electro-optical scanning and reproduction system of this invention.

FIGURE 2 is a diagrammatic perspective view of one form of the electro-optical scanning system which may be utilized in FIGURE 1 for reproduction of planar images.

FIGURE 3 is a diagrammatic perspective view of another form of the electro-optical scanning system for line scanning purposes.

FIGURE 4 is a diagrammatic perspective view of a further form of the electro-optical scanning system for checking contours of objects or the like.

FIGURE 5 is an illustration showing the electro-optical scanning system of this invention operating a digital computer or the like.

Referring first to FIGURES 1 and 2, the electro-optical scanning system of this invention comprises a fiber optical bundle 10 which includes a plurality of optically isolated light transmitting fibers 11 which terminate at one end in an image plane 12 and at the other end in a scanning plane 13. The optically isolated light transmitting fibers 11 may be formed of glass fibers of suitable diameter, such as a few thousandths of an nch, each being optically isolated from its neighbor. When light is applied to the image end 12 of the light transmitting fibers 11 the light is transmitted by the fibers to the scanning plane 13. As shown more clearly in FIGURE 2 the fiber ends in the image plane 12 are arranged in an area pattern, as for example three rows a, b, c of four ends 1, 2, 3, 4 in each row. Of course, any number of rows of fiber ends and any number of fiber ends in each row may be utilized to build up the desired area pattern in the image plane. The other ends of the fibers 11 in the scanning plane 13 are arranged in a circle and as illustrated in FIGURE 2 the fiber ends in the scanning plane are sequentially arranged with respect to the fiber ends in the image plane 12, as indicated by the designations a1 through c4.

An objective lens 15 is arranged adjacent the image plane of the fiber optical bundle 10 for projecting a light image of an object 16 onto the fiber ends in the image plane 12 for transmission by the fibers 11 to the circularly arranged fiber ends in the scanning plane 13. The light transmitted to and appearing at the circularly arranged fiber ends in the scanning plane 13 is condensed by a suitable lens 18 onto a photocell 19 of a photoelectric unit. Interposed between the condensing lens 18 and the scanning plane 13 is a rotating disc 20 operated at a desired speed, such as a synchronous speed, by an electric motor 21, the scanner disc 20 having a radial slit 22 which progressively sweeps over the circularly arranged fiber ends in the scanning plane 13. In this way pulses of light are directed to the photocell 19 in accordance with the light intensities at the fiber ends in the scanning plane 13 for pulsing the photocell 19 and creating electrical pulses in accordance with the light intensities at said fiber ends.

The width of the radial slit 22 of the rotating scanner 20 is equal to or less than the width of the fiber ends in the scanning plane 13 so that each circularly arranged fiber end in the scanning plane is individually scanned and analyzed during each revolution of the scanner disc 20, thereby providing a complete "frame" of information in a period well above the tolerable flicker rate for human vision while using very practical rotation speeds. For example, a 1800 r.p.m. motor provides a 1/30 second "frame" rate. Thus the scanner 20 with the single radial slit 20 operates to analyze each element of the image projected onto the fiber ends in the image plane 12.

If the spacing between the circularly arranged fiber ends in the scanning plane 13 is less than the width of the radial slit 20, the radial slit in progressively sweeping over the fiber ends will expose adjacent portions of adjacent fiber ends so that the electrical pulses produced by the photocell 19 will be somewhat modulated in character, there being, however, definite pulses in accordance with the light intensities at the fiber ends. On the other hand, if the spacing between the circularly arranged fiber ends in the scanning plane 13 is greater than the width of the radial slit 22, there will be a definite and positive cut-off of light to the photocell 19 as the radial slit sweeps from one fiber end to the other end. As a result, separate and discrete electrical pulses will be created by the photocell 19 in accordance with the light intensities at the fiber ends.

As shown in FIGURE 1, the photocell 19 may control a suitable transmitter 24 for sending corresponding electrical pulses to a receiver 25 which in turn applies corresponding pulses to a light source 26 which in turn creates light pulses corresponding to the electrical pulses. In this way the light source or lamp 26 is pulsed in complete correspondence to the electrical pulses produced by the photocell 19. The light pulses of the light source 26 are densed by a suitable lens 27 onto a read in plane 28 of a second fiber optical bundle 29 which corresponds to the first optical bundle 10. One end of the fibers in the second fiber bundle are circularly arranged in the read in plane 28 and the other ends of the fibers are arranged in an area pattern in a read out plane 30 which corresponds to the area pattern 12 of the first fiber optical bundle 10. A disc 31 is interposed between the read in plane 28 and the condensing lens 27 and it is provided with a radial slit corresponding to the radial slit 22 in the scanner disc 20 and is driven at a synchronous speed by an electrical motor 32. The position and speed of the disc 31 is synchronous with and corresponds to the position and speed of the scanner disc 20. The disc 31 with its radial slit therefore sequentially applies the light pulse from the pulsing lighting source 26 onto the appropriate circularly arranged fiber ends in the read in plane 28 for transmission through the fibers to the read out plane 30 for reproducing the image on the read out plane 30. This image on the read out plane 30 may be applied by a suitable lens 33 onto a surface 34 such as a screen or a photo-sensitive surface for exhibiting and/or permanently reproducing the image.

As described above in connection with FIGURE 2 there is a systemmatic relationship between the fiber ends in the image plane and the circularly arranged fiber ends in the scanning plane and, of course, a corresponding arrangement is utilized in the second fiber optical bundle 29 so that appropriate reproduction of the image is obtained. Such an arrangement is particularly useful where an independent and regular analysis of each point in the image is sequentially desired, as where digital information on each successive point is desired. However, the fiber ends in the image plane of the first fiber optical bundle may be randomly arranged and if the fiber ends in the read out plane of the second fiber optical bundle are correspondingly arranged, there will be a faithful reproduction of the image. Such an arrangement is particularly useful for the transmission of confidential intelligence where the first fiber optical bundle would operate to code the intelligence and the second corresponding fiber optical bundle would decode the same. Therefore, decoding could be accomplished only where the second fiber optical bundle corresponds exactly to the first and fiber optical bundle.

Referring now to FIGURE 3, there is disclosed an electro-optical scanning system which is particularly adaptable for facsimile or telemetering purposes. It utilizes the same fiber optical bundle 10, scanner disc 20, condensing lens 18 and photoelectric unit 19. Here also the fiber ends in the scanning plane 13 are circularly arranged. However, the fiber ends in the image plane 12 are arranged in a single line, the fiber ends in the image plane 12 being uniformly associated with the fiber ends in the scanning plane 13 as indicated by the numerals 1 to 10. Here an object 36 in the form of information, such as letters, numbers, words, code markings or the like is arranged on a moving web 37 carried by rolls 38 and 39, the web with the information thereon progressively moving past the fiber ends in the image plane 12. An objective lens 15 directs the moving object on the roll onto the fiber ends in the image plane 12. Thus, the optical bundle 10 operates to provide line scanning of the moving object. Here a second fiber optical bundle may be utilized as in FIGURE 1 for reproducing the image at the single line of fiber ends in the read out plane of the second bundle and this reproduced image may be directed by a suitable lens onto a moving photographic web for correspondingly permanently reproducing the moving object. In this way a web of typewritten or printed material or photographs or the like may be line scanned and transmitted to a remote point for faithful facsimile reproduction. While FIGURE 3 shows only a ten element line of fibers, any number of elements can be utilized in the line. For example, a two thousand element line will provide sufficient resolution to read the normal typewritten page and it could be arranged at the scanning plane of the fiber optical bundle in a circle only a little over three inches in diameter.

FIGURE 4 illustrates an electro-optical scanning system which is particularly useful for quality control, as for example the checking of a contour of a manufactured part. Here also the same fiber optical bundle 10 with its fiber ends circularly arranged in the scanning plane 13 and the same scanner disc 20 with its radial slot 22 and the same condensing lens 18 and photoelectric unit 19 are utilized. Here, however, the fiber ends in the image plane 12 are arranged in a plurality of rows corresponding to the desired accurate contour of the object to be checked. The object to be checked 43 is arranged in front of the image plane 12 with its contour 42 to be checked arranged along the lines of the fiber ends. An image of the object to be checked may be projected onto the image plane 12 by an objective lens 15 as described above. Alternatively, a light source 44 is condensed into substantially parallel rays by a suitable collimating lens 45 and projected onto the image plane 12 of the fiber optical bundle 10. Depending upon the contour 42 of the object 43 light will be applied to certain of the fiber ends and be cut off from the other fiber ends. In either arrangement, any deviation of the contour 42 of the object 43 from the desired object will immediately be determined by the electro-optical scanning system. This can be done by reproducing the image in the manner described above in connection with FIGURE 1 or it can be done with a digital computer or the like 48 as illustrated in FIGURE 5 where the digital computer is pulsed by the photoelectric unit 19.

Other arrangements of the fiber ends in the image plane may be utilized, within the purview of this invention, for other purposes, as for example calipering, thickness measurement and the like.

While for purposes of illustration several forms of this invention have been disclosed, other forms thereof may become apparent to those skilled in the art upon reference to this disclosure, and, therefore, this invention should be limited only by the scope of the appended claims.

I claim as my invention:

1. An electro-optical scanning system comprising, a fiber optical bundle including a plurality of optically isolated light transmitting fibers terminating at one end in an image plane and at the other end in a scanning plane, the fiber ends in the scanning plane being arranged in a circle, means for applying a light image to the fiber ends in the image plane for transmission by the fibers to the scanning plane, and scanning means including a stationary photoelectric pickup unit facing the scanning plane and a rotating scanner adjacent the scanning plane having a light transmitting aperture therein progressively scanning the circularly arranged fiber ends in the scanning plane for pulsing the photoelectric pickup unit and creating electrical pulses in accordance with the light intensities at said fiber ends.

2. An electro-optical scanning system comprising, a fiber optical bundle including a plurality of optically isolated light transmitting fibers terminating at one end in an image plane and at the other end in a scanning plane, the fiber ends in the scanning plane being arranged in a circle, means for applying a light image to the fiber ends in the image plane for transmission by the fibers to the scanning plane, and scanning means including a stationary photoelectric pickup unit facing the scanning plane and a rotating radial slit scanner adjacent the scanning plane progressively scanning the circularly arranged fiber ends in the scanning plane for pulsing the photoelectric pickup unit and creating electrical pulses in accordance with the light intensities at said fiber ends.

3. An electro-optical scanning system comprising a fiber optical bundle including a plurality of optically isolated light transmitting fibers terminating at one end in an image plane and at the other end in a scanning plane, the fiber ends in the scanning plane being arranged in a circle, means for applying a light image to the fiber ends in the image plane for transmission by the fibers to the scanning plane, a stationary photoelectric pickup unit facing the scanning plane, means for condensing light from the circularly arranged fiber ends in the scanning plane onto the photoelectric pickup unit, and a rotating radial slit scanner between the scanning plane and the light condensing means progressively sweeping the circularly arranged fiber ends in the scanning plane for pulsing the photoelectric pickup unit in accordance with the light intensities at said fiber ends.

4. An electro-optical scanning system comprising, a fiber optical bundle including a plurality of optically isolated light transmitting fibers terminating at one end in an image plane and at the other end in a scanning plane, the fiber ends in the scanning plane being arranged in a circle, the fiber ends in the image plane being arranged in an area pattern, means for applying a light image to the fiber ends in the image plane for transmission by the fibers to the scanning plane, and scanning means including a stationary photoelectric pickup unit facing the scanning plane and a rotating scanner having a light transmitting aperture therein adjacent the scanning plane progressively scanning the circularly arranged fiber ends in the scanning plane for pulsing the photoelectric pickup unit and creating electrical pulses in accordance with the light intensities at said fiber ends.

5. An electro-optical scanning system comprising, a fiber optical bundle including a plurality of optically isolated light transmitting fibers terminating at one end in an image plane and at the other end in a scanning plane, the ends of the fibers in the image plane being regularly arranged in rows in an area pattern and the other ends of the fibers in the scanning plane being respectively regularly arranged in a circle, means for applying a light image to the fiber ends in the image plane for transmission by the fibers to the scanning plane, and scanning means including a stationary photoelectric pickup unit facing the scanning plane and a rotating scanner having a light transmitting aperture therein adjacent the scanning plane progressively scanning the circularly arranged fiber ends in the scanning plane for pulsing the photoelectric pickup unit and creating electrical pulses in accordance with the light intensities at said fiber ends.

6. An electro-optical scanning system comprising, a fiber optical bundle including a plurality of optically isolated light transmitting fibers terminating at one end in an image plane and at the other end in a scanning plane, the fiber ends in the scanning plane being arranged in a circle, the fiber ends in the image plane being randomly arranged in an area pattern, means for applying a light image to the fiber ends in the image plane for transmission by the fibers to the scanning plane, and scanning means including a stationary photoelectric pickup unit facing the scanning plane and a rotating scanner having a light transmitting aperture therein adjacent the scanning plane progressively scanning the circularly arranged fiber ends in the scanning plane for pulsing the photoelectric pickup unit and creating electrical pulses in accordance with the light intensities at said fiber ends.

7. An electro-optical scanning system comprising, a fiber optical bundle including a plurality of optically isolated light transmitting fibers terminating at one end in an image plane and at the other end in a scanning plane, the fiber ends in the scanning plane being arranged in a circle, the ends of the fibers in the image plane being arranged in a single row, means for moving an object to be scanned past the single row of fiber ends in the image plane and for applying a light image thereof to the fiber ends in the image plane for transmission by the fibers to the scanning plane, and scanning means including a stationary photoelectric pickup unit facing the scanning plane and a rotating scanner having a light transmitting aperture therein adjacent the scanning plane progressively scanning the circularly arranged fiber ends in the scanning plane for pulsing the photoelectric pickup unit and creating electrical pulses in accordance with the light intensities at said fiber ends.

8. An electro-optical scanning system for checking the accuracy of a contour of an object comprising, a fiber optical bundle including a plurality of optically isolated light transmitting fibers terminating at one end in an image plane and at the other end in a scanning plane, the fiber ends in the scanning plane being arranged in a circle, the ends of the fibers in the image plane being arranged in a plurality of rows in accordance with the accurate contour of the object to be checked, means for applying a light image of the contour of the object to be checked to the fiber ends in the image plane for transmission by the fibers to the scanning plane, and scanning means including a stationary photoelectric pickup unit facing the scanning plane and a rotating scanner having a light transmitting aperture therein adjacent the scanning plane progressively scanning the circularly arranged fiber ends in the scanning plane for pulsing the photoelectric pickup unit and creating electrical pulses in accordance with the light intensities at said fiber ends.

9. An electro-optical scanning and reproduction system comprising, a first fiber optical bundle including a plurality of optically isolated light transmitting fibers terminating at one end in an image plane and at the other end in a scanning plane being arranged in a circle, means for applying a light image to the fiber ends in the image plane for transmission by the fibers to the scanning plane, scanning means including a stationary photoelectric pickup unit facing the scanning plane and a rotating scanner having a light transmitting aperture therein adjacent the scanning plane progressively scanning the circularly arranged fiber ends in the scanning plane for pulsing the photoelectric pickup unit and creating electrical pulses in accordance with the light intensities at said fiber ends, a second fiber optical bundle corresponding to the first fiber optical bundle and including a plurality of optically isolated light transmitting fibers terminating at one end in a read in plane and at the other end in a read out plane with the fiber ends in the read in plane being arranged in a circle, means adjacent the read in plane of the second fiber optical bundle including a light source which is pulsed in accordance with the electrical pulses created by the scanning means and means for progressively applying the light pulses to the circularly arranged fiber ends in the read in plane of the second fiber optical bundle for transmission by the fibers to the read out plane for reproducing the light image at the read out plane.

10. An electro-optical scanning system comprising, a fiber optical bundle including a plurality of optically isolated light transmitting fibers terminating at one end in an image plane and at the other end in a scanning plane, the fiber ends in the scanning plane being spaced apart and arranged in a circle, means for applying a light image to the fiber ends in the image plane for transmission by the fibers to the scanning plane, and scanning means including a stationary photoelectric pickup unit facing the scanning plane and a rotating scanner having a light transmitting aperture therein adjacent the scanning plane progressively scanning one at a time the spaced apart circularly arranged fiber ends in the scanning plane for pulsing the photoelectric pickup unit and creating separate discrete electrical pulses in accordance with the light intensities at said fiber ends.

11. An electro-optical scanning system comprising, a fiber optical bundle including a plurality of optically isolated light transmitting fibers terminating at one end in an image plane and at the other end in a scanning plane, the fiber ends in the scanning plane being spaced apart and arranged in a circle, means for applying a light image to the fiber ends in the image plane for transmission by the fibers to the scanning plane, and scanning means adjacent the scanning plane including a stationary photoelectric pickup unit facing the scanning plane and a rotating scanner having a radial slit of less width than the spacing between the spaced apart circularly arranged fiber ends in the scanning plane progressively scanning one at a time said fiber ends for pulsing the photoelectric pickup unit and creating separate discrete electrical pulses in accordance with the light intensities at said fiber ends.

12. An electro-optical scanning system comprising, a fiber optical bundle including a plurality of optically isolated light transmitting fibers terminating at one end in an image plane and at the other end in a scanning plane, the fiber ends in the scanning plane being spaced apart and arranged in a circle, means for applying a light image to the fiber ends in the image plane for transmission by the fibers to the scanning plane, scanning means including a stationary photoelectric pickup unit facing the scanning plane and a rotating scanner having a light transmitting aperture therein adjacent the scanning plane progressively scanning one at a time the spaced apart circularly arranged fiber ends in the scanning plane for pulsing the photoelectric pickup unit and creating separate discrete electrical pulses in accordance with the light intensities at said fiber ends, and a digital computer operated by said separate discrete electrical pulses.

References Cited in the file of this patent

UNITED STATES PATENTS

| | | |
|---|---|---|
| Re. 21,105 | Round | May 30, 1939 |
| 1,751,584 | Hansell | Mar. 25, 1930 |
| 2,122,750 | Nicolson | July 5, 1938 |
| 2,840,632 | Parker | June 24, 1958 |

Notice of Adverse Decision in Interference

In Interference No. 93,274 involving Patent No. 3,036,153, R. G. Day, ELECTRO-OPTICAL SCANNING SYSTEM, final judgment adverse to the patentee was rendered Nov. 25, 1964, as to claims 1, 4, 5 and 7.

[*Official Gazette March 30, 1965.*]